July 2, 1968

L. E. FISHER 3,391,378

PLUG-IN TYPE HIGH FREQUENCY BUSWAY

Filed May 9, 1966

INVENTOR.
LAWRENCE E. FISHER
BY Robert T. Casey
ATTORNEY

July 2, 1968 L. E. FISHER 3,391,378
PLUG-IN TYPE HIGH FREQUENCY BUSWAY
Filed May 9, 1966 2 Sheets-Sheet 2

INVENTOR.
LAWRENCE E. FISHER
BY Robert H. Casey
ATTORNEY

United States Patent Office 3,391,378
Patented July 2, 1968

3,391,378
PLUG-IN TYPE HIGH FREQUENCY BUSWAY
Lawrence E. Fisher, West Hartford, Conn., assignor to
General Electric Company, a corporation of New York
Filed May 9, 1966, Ser. No. 548,723
8 Claims. (Cl. 339—22)

ABSTRACT OF THE DISCLOSURE

A plug-in type, high frequency, low impedance busway having closely spaced bus bars, some of the bars having portions slit longitudinally, the portions defined by said slit being spread vertically and offset laterally to provide contact areas which are spaced so as to be capable of receiving the stabs of a standard plug-in type power take-off device.

BACKGROUND OF THE INVENTION

*Field of the invention*

My invention relates to electric-power busways, and more particularly to multiphase busways with more than one bar per phase, of the type intended for use with high-frequency alternating current power systems and having the bus bars mounted close together in order to minimize impedance, and therefore voltage drop.

*Description of the prior art*

In plug-in type busways designed for low impedance at high alternating current frequency, the spacing between bus bars may be required to be so small as to preclude the use of standard plug-in type power take-off devices. Thus it is necessary to employ specially modified plug-in devices in which the spacing of the plug-in stabs has been altered so as to correspond to that of the bus bars of the busway. An alternate expedient, according to the prior art, is to spread the bus bars apart at desired points to permit the use of standard plug-in devices.

OBJECTS OF THE INVENTION

It is a primary object of my invention to provide a plug-in type busway having closely-spaced bus bars which are adapted to utilize plug-in type power take-off devices, which are presently available which are designed for use with systems having more widely spaced bus bars.

It is another object of my invention to provide a plug-in type busway in which the bus bars may be supported in more closely spaced relation than that which has existed heretofore in plug-in type busways.

SUMMARY OF THE INVENTION

In accordance with one form of the invention, there is provided a multiphase busway having more than one bus bar per phase. The bus bars are supported in side-by-side relation with at least one edge of each of the bars lying in a common plane. Several of the bars are slit longitudinally along a portion of the length thereof, dividing this portion into two parallel portions substantially one-half the width of the original bus bar. The parallel portions are spread outwardly from the slit, while remaining in their original planes. Each portion is then offset at right angles to the direction of spreading so as to form a generally U-shaped configuration. The slitting, spreading, and offsetting of the bus bars provides the proper spacing between the bus bars at the bight portions of said U- so as to allow the use of standard plug-in power take-off devices.

The invention will be more fully understood by reference to the following detailed description, taken in conjunction with the accompanying drawings, and its scope will be pointed out in the appended claims.

DESCRIPTION OF A PREFERRED EMBODIMENT

Figure 1:
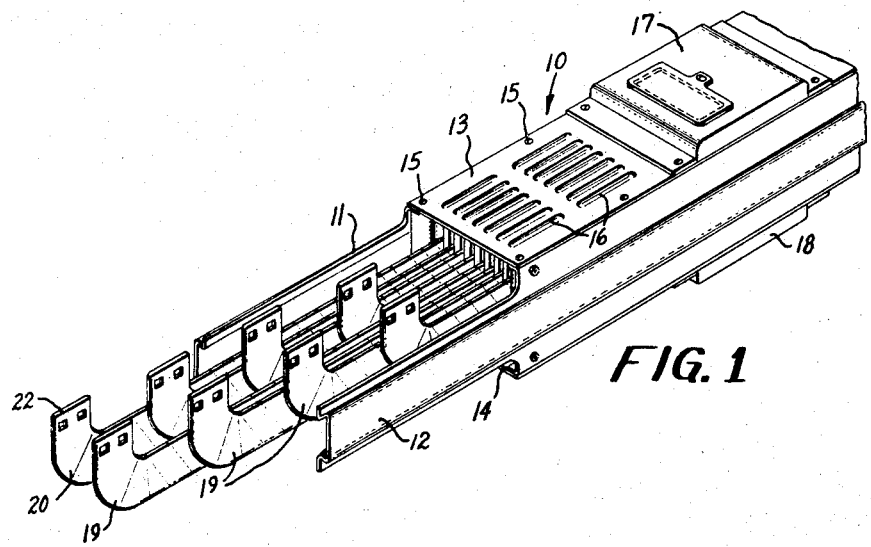
FIGURE 1 is a perspective view of a portion of a busway section incorporating the present invention.
Figure 2:
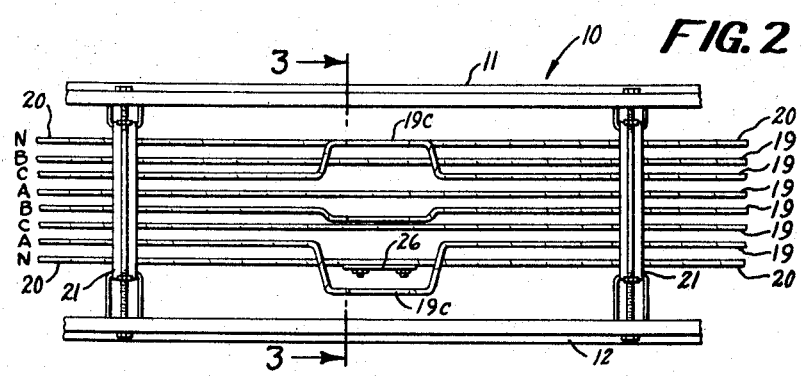
FIGURE 2 is a plan view of the busway of FIGURE 1 with housing portions removed to more clearly show the bus bars.

Referring now to FIGURE 1, the invention is shown as embodied in a busway section comprising an elongated generally rectangular housing 10 including side walls 11 and 12, and top and bottom walls 13 and 14, respectively. The walls are joined together by suitable means such as screws 15 passing through overlapping edge portion thereof.

The top and bottom walls 13 and 14 are provided with plug-in openings enclosed by covers 17 and 18, respectively. As shown in FIGURE 1, ventilation openings 16 may be employed in the top and bottom walls 13 and 14 in order to assist in the dissipation of heat generated in the busway housing 10.

Enclosed in the housing 10, in the preferred embodiment, are two sets of three-phase bus bars 19, and a pair of neutral bus bars 20, the phase relationship of the bus bars being NBCABCAN. The parallel, closely-spaced, flat bus bars 19 and 20 are adapted to be supported within the busway housing 10, by suitable insulating and supporting means 21, as disclosed for example in Patent No. 2,576,774 issued Nov. 27, 1951, to E. T. Carlson and assigned to the same assignee as the present invention.

As shown in FIGURE 1, the end portions 22 of the bus bars 19 and 20 are bent edgewise from the general plane of the bars to facilitate interconnection with the bus bars of adjacent sections to comprise a busway system. This interconnection of bars may be accomplished in the manner disclosed in Patent No. 2,468,614, issued Apr. 26, 1949 to E. T. Carlson and assigned to the same assignee as the present invention.

Figure 3:
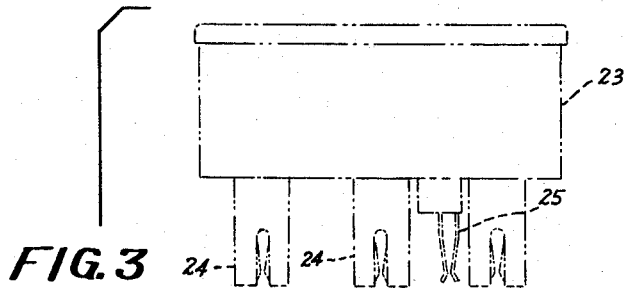
FIGURE 3 is a cross-sectional view of the busway, taken on a section such as line 3—3 in FIGURE 2, and also showing in dotted lines a standard plug-in type power take-off device, in exploded relation to the busway.
Figure 3:
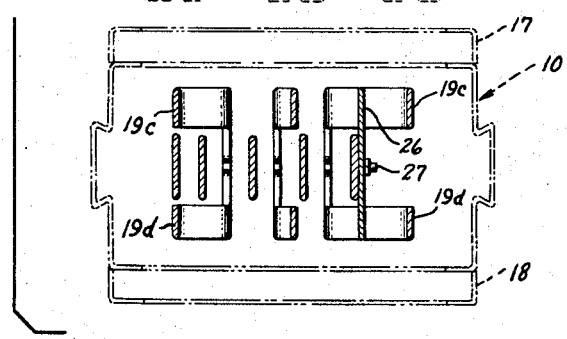

In a high frequency busway, the spacing relationship of the bus bars is such as to normally preclude the use of a standard plug-in type power take-off device 23, of the type shown for example, in dotted lines in FIGURE 3. However, by following the teaching of the invention, it is now possible to employ a standard plug-in type power take-off device with a high frequency busway without increasing the spacing between individual bus bars proper, and without utilizing a specially modified plug-in device.

Figure 4:
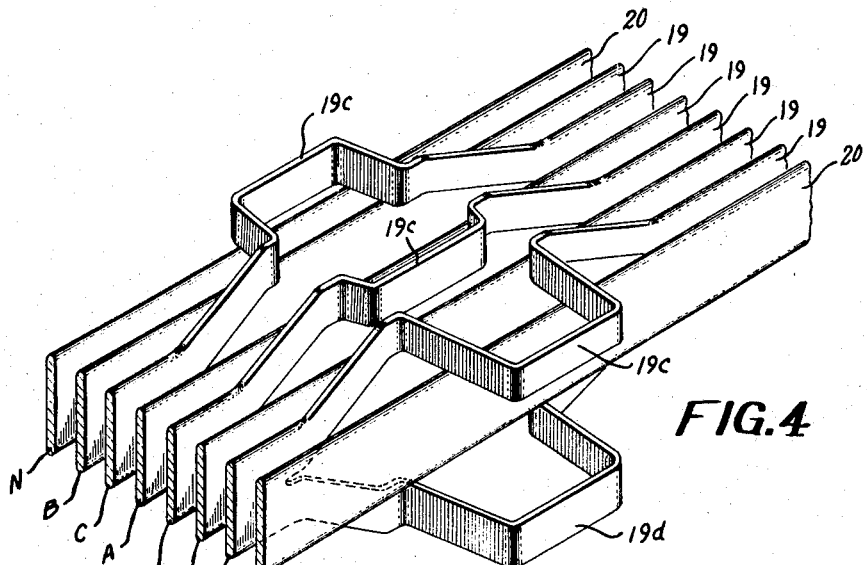
FIGURE 4 is a perspective view showing the offset bus bars in greater detail.
Figure 5:
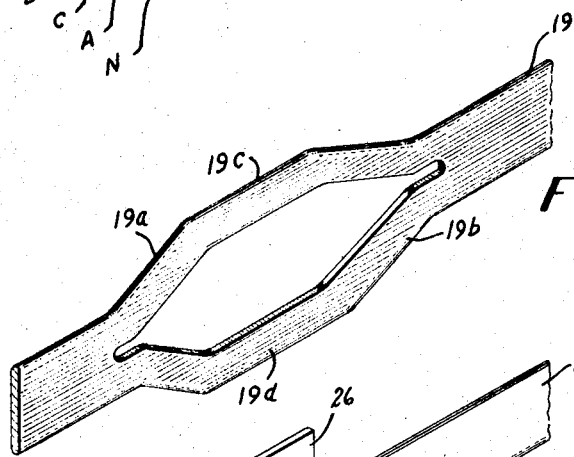
FIGURE 5 is a side view of a bus bar showing the slit and spread portions thereof.
Figure 6:
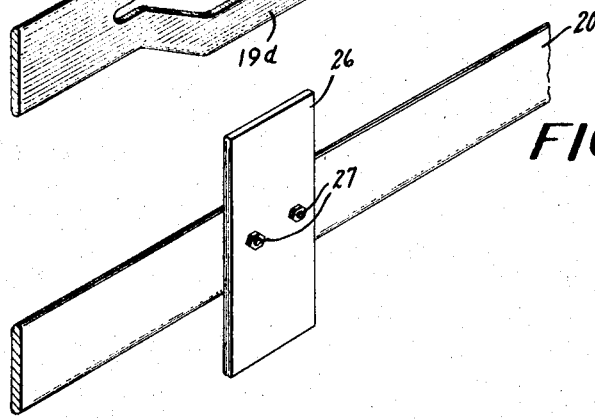
FIGURE 6 is a side view of another embodiment of a bus bar in which the bar is provided with a separate, non-integral, plug-in contact member.

Thus in accordance with the invention, the bus bars, to which plug-in connections are to be made, are slit at a plug-in location. These bus bars, as best shown in FIGURE 4, include a phase A, a phase B, and a phase C bar. Following the slitting, the generally parallel portions 19a and 19b of each of these bars, which portions extend longitudinally on either side of the slit, are spread outwardly, as shown for example, in FIGURE 5.

The central regions 19c and 19d of the spread portions 19a and 19b, respectively, are then offset at right angles out of the plane of the bar to a sufficient extent to provide the proper spacing of the bus bars for receiving the stabs 24 of a standard plug-in power take-off device 23. The portions of the slit bars which have been spread and offset thus form substantially a U having flanged endings, as best seen in FIGURE 4. Since the portions extending longitudinally on either side of the slit have been spread and offset, this permits plug-in connections to be made from both sides of the busway, i.e., from top and bottom.

The bus bars 19 to which plug-in connections are not to be made, are each tape-wrapped along their entire length with a suitable insulation material, for the purpose of adequately insulating these bus bars from adjacent bars as well as from the busway housing 10. The end portions 22 of these bus bars 19, to which bars of adjoining busway sections are interconnected, are, of course, left free of the insulation wrap in order to enable the interconnection to be made.

To insulate the other bus bars 19, i.e., those to which plug-in connections are to be made, the spread portions 19a and 19b of the bars, except for the central regions 19c and 19d, are individually tape-wrapped with suitable insulation material. Then the entire lengths of the bars, other than the spread and offset portions, are tape-wrapped with additional lengths of the same type of insulation material. Here also, the end portions 22 of the bus bars are not insulated in order to enable the interconnection of adjoining sections of busway to be made. The uninsulated portions of the bus bars 19 thus provide areas in which plug-in connections can be made by means of the stabs 24 of the standard plug-in type power take-off device 23.

The neutral bus bars 20 are also tape-wrapped with suitable insulation material along their entire length except for their end portions 22. However, the member 26 that is securely fastened by suitable means such as by screws 27 to one of the neutral bars 20 is not insulated in order to provide an area in which the neutral stab 25 of the standard plug-in device 23 can engage the bar.

Although not shown, it is to be understood that all bars of common electrical identity or "phase" may be, and preferably, are, connected together, such connection being referred to as a "phase-collection" connection. The purpose of such a connection is to insure that the current drawn by plug-in type power take-off devices, which contact only some of the bars, will be equally divided among all such bars throughout the major portion of the busway.

While the specific embodiment of the invention which has been shown includes two sets of three-phase bus bars and two neutral bus bars, it will be readily appreciated that more or fewer bars could be used without departing from the spirit and scope of the invention, and I, therefore, intend by the appended claims to cover all such modifications as fall within the true spirit and scope of the invention.

What I claim as new and desire to secure by Letters Patent of the United States is:

1. A plug-in type high frequency low impedance electric power busway for use with a plug-in type power take-off device having a plurality of plug-in type contacts spaced apart predetermined distances respectively comprising:
   (a) an elongated housing of generally rectangular cross-section;
   (b) said housing having at least one opening intermediate its ends for accommodating said plug-in type power take-off device;
   (c) a plurality of elongated, closely-spaced, insulated, flat bus bars, the spacing of said bus bars being different from said predetermined distances respectively thereby precluding engagement of said plug-in contacts with said bus bars, said bus bars each having a pair of opposed relatively wide surfaces and a pair of opposed edged portions, said bus bars being supported within said housing with said relatively wide surfaces in substantially parallel relation and with at least one of said edge portions of each of said bus bars lying in a common plane;
   (d) at least some of said bus bars having deformed portions intermediate the ends thereof extending outwardly from said common plane, said deformed portions being aligned with said opening; and
   (e) said deformed portions being free of insulation and being spaced from each other at distances respectively equal to said predetermined distances of said contacts of said plug-in type power take-off device, whereby plug-in connection may be made therewith by said plug-in type contacts of said plug-in type power take-off device.

2. A plug-in type high frequency low impedance electric power busway for use with a plug-in type power take-off device having a plurality of plug-in type contacts spaced apart predetermined distances respectively comprising:
   (a) an elongated housing of generally rectangular cross-section having a pair of opposite sides;
   (b) said housing having at least one opening in each of said opposite sides intermediate its ends for accommodating said plug-in type power take-off device;
   (c) a plurality of elongated, closely-spaced, insulated, flat bus bars, the spacing of said bus bars being different from said predetermined distances respectively thereby precluding engagement of said plug-in contacts with said bus bars, said bus bars each having a pair of opposed relatively wide surfaces and a pair of opposed edge portions, said bus bars being supported within said housing with said relatively wide surfaces in substantially parallel planes;
   (d) at least some of said bus bars having a longitudinal slit in the wide surfaces thereof aligned with said openings, the portions of said bars extending longitudinally above and below each of said slits being spread outwardly therefrom; and
   (e) said spread portions being free of insulation and being spaced from each other at distances respectively equal to said predetermined distances of said contacts of said plug-in type power take-off device, whereby plug-in connections may be made therewith by said plug-in type contacts of said plug-in type power take-off device from either of said opposite sides of said housing.

3. A plug-in type high frequency low impedance electric power busway for use with a plug-in type power take-off device having a plurality of plug-in type contacts spaced apart predetermined distances respectively comprising:
   (a) an elongated housing of generally rectangular cross-section;
   (b) said housing having at least one opening intermediate its ends for accommodating said contacts of said plug-in type power take-off device;
   (c) a plurality of elongated, closely-spaced, insulated, flat bus bars, the spacing of said bus bars being different from said predetermined distances respectively thereby precluding engagement of said plug-in contacts with said bus bars, said bus bars each having a pair of opposed relatively wide surfaces and a pair of opposed edge portions, said bus bars being supported within said housing with said relatively wide surfaces in substantially parallel relation, and with at least one of said edge portions of each of said bus bars lying in a common plane;
   (d) at least some of said bus bars having deformed portions intermediate the ends thereof extending outwardly from said common plane, said deformed portions also being offset in a plane parallel to said common plane, said deformed portions being aligned with said opening; and
   (e) said deformed portions being free of insulation and being spaced from each other at distances respectively equal to said predetermined distances of said plug-in type contacts of said plug-in type power take-off device whereby plug-in connection may be made therewith by said plug-in type contacts of said plug-in type power take-off device.

4. A plug-in type high frequency low impedance electric power busway as set forth in claim 3 wherein at least one of said plurality of bus bars other than said bus bars having said deformed portions has securely fixed thereto an uninsulated contact member, said contact member extending outwardly from said common plane in alignment with said opening whereby plug-in connection may also be made therewith by one of said plug-in type contacts of said plug-in type power take-off device.

5. A plug-in type high frequency low impedance electric power busway for use with a plug-in type power take-off device having a plurality of plug-in type contacts spaced apart predetermined distances respectively comprising:
    (a) an elongated housing of generally rectangular cross-section having a pair of opposite sides;
    (b) said housing having at least one opening in each of said opposite sides intermediate its ends for accommodating said plug-in type power take-off device;
    (c) a plurality of elongated, closely-spaced, insulated, flat bus bars, the spacing of said bus bars being insufficient to permit engagement of said plug-in contacts with said bus bars, said bus bars each having a pair of opposed relatively wide surfaces and a pair of opposed edge portions, said bus bars being supported within said housing with said relatively wide surfaces in substantially parallel planes;
    (d) at least some of said bus bars having a longitudinal slit in the wide surfaces thereof, the portions of said bars extending longitudinally above and below each of said slits being spread outwardly therefrom;
    (e) said portions also being offset in a direction transverse to said substantially parallel planes, said portions being aligned with said openings; and
    (f) said offset portions being free of insulation and being spaced from each other at distances respectively equal to said predetermined distances of said contacts of said plug-in type power take-off device, whereby plug-in connection may be made therewith by said plug-in type power take-off device from either of said opposite sides of said housing.

6. A plug-in type high frequency low impedance electric power busway as set forth in claim 5 wherein at least one of said plurality of bus bars other than said bus bars having said offset portions has securely fixed thereto an uninsulated contact member extending at right angles thereto in opposite directions and aligned with said openings whereby plug-in connection may also be made therewith by one of said plug-in type contacts of said plug-in type power take-off device from either of said opposite sides of said housing.

7. For use in a three-phase electric power system, a plug-in type high frequency low impedance electric power busway for use with a plug-in type power take-off device having at least three plug-in type contacts spaced apart predetermined distances respectively comprising:
    (a) an elongated housing of generally rectangular cross-section;
    (b) said housing having at least one opening intermediate its ends for accommodating said plug-in type power take-off device;
    (c) a plurality of elongated, closely-spaced insulated, flat bus bars, comprising at least two bars per phase of said three phase power system, the spacing of said bus bars being different from said predetermined distances respectively thereby precluding engagement of said plug-in contacts with said bus bars, said bus bars each having a pair of opposed relatively wide surfaces and a pair of opposed edge portions, said bus bars being supported within said housing with said relatively wide surfaces in substantially parallel relation and with at least one of said edge portions of each of said bus bars lying in a common plane;
    (d) at least some of said bus bars having deformed portions intermediate the ends thereof extending outwardly from said common plane, said deformed portions being aligned with said opening; and
    (e) said deformed portions being free of insulation and being spaced from each other at distances respectively equal to said predetermined distances of said contacts of said plug-in type power take-off device, whereby plug-in connection may be made therewith by said plug-in type contacts of said plug-in type power take-off device.

8. For use in a three-phase electric power system, a plug-in type high frequency low impedance electric power busway as set forth in claim 7 wherein at least one of said plurality of bus bars other than said bus bars having said deformed portions has securely fixed thereto an uninsulated contact member, said contact member extending outwardly from said common plane in alignment with said opening whereby plug-in connection may also be made therewith by one of said plug-in type contacts of said plug-in type power take-off device.

References Cited

UNITED STATES PATENTS

| 2,970,286 | 1/1961 | Modrey | 339—21 XR |
| 2,981,926 | 4/1961 | Boardman | 339—22 XR |
| 3,012,218 | 12/1961 | Cataldo | 339—22 |
| 3,148,008 | 9/1964 | Herrmann | 339—22 |
| 3,206,706 | 9/1965 | Cataldo et al. | 339—22 |

RICHARD E. MOORE, *Primary Examiner.*

PATRICK A. CLIFFORD, *Assistant Examiner.*